(12) United States Patent
Seal et al.

(10) Patent No.: US 7,756,160 B2
(45) Date of Patent: Jul. 13, 2010

(54) PACKET CONSOLIDATION

(75) Inventors: Brian Seal, Powell, TN (US); John Bettendorff, San Francisco, CA (US); Ruben Salazar Cardozo, Alpharetta, GA (US)

(73) Assignee: Cellnet Technology, Inc., Alpharetta, GA (US)

(*) Notice: Subject to any disclaimer, the term of this patent is extended or adjusted under 35 U.S.C. 154(b) by 258 days.

(21) Appl. No.: 11/941,617

(22) Filed: Nov. 16, 2007

(65) Prior Publication Data

US 2009/0129407 A1    May 21, 2009

(51) Int. Cl.
*H04J 3/24* (2006.01)

(52) U.S. Cl. ...................................... 370/473

(58) Field of Classification Search ............... 370/473, 370/465, 355, 395, 471, 389, 358, 393, 401, 370/466, 467, 400, 408, 230.1, 468, 478, 370/352, 353, 365, 278, 282, 458, 392; 709/230, 709/236, 240, 250
See application file for complete search history.

(56) References Cited

U.S. PATENT DOCUMENTS

| | | | | |
|---|---|---|---|---|
| 5,754,768 A | * | 5/1998 | Brech et al. ................ | 709/230 |
| 5,854,786 A | * | 12/1998 | Henderson et al. ........... | 370/335 |
| 6,088,659 A | | 7/2000 | Kelley et al. | |
| 7,031,338 B2 | * | 4/2006 | Weaver ...................... | 370/465 |
| 7,400,264 B2 | * | 7/2008 | Boaz ....................... | 340/870.02 |
| 7,522,592 B2 | * | 4/2009 | Kanetake et al. ............ | 370/389 |
| 2007/0258508 A1 | | 11/2007 | Werb et al. | |

OTHER PUBLICATIONS

"Notification of Transmittal of the International Search Report and the Written Opinion of the International Searching Authority, Or The Declaration". May 20, 2008.

"Written Opinion of the International Searching Authority". May 20, 2008.

* cited by examiner

*Primary Examiner*—Chi H Pham
*Assistant Examiner*—Alexander Boakye
(74) *Attorney, Agent, or Firm*—Fish & Richardson P.C.

(57) ABSTRACT

Systems, methods, and devices for consolidating network packetized data are disclosed. Data packets are received by a consolidator. Common content and unique attributes of the packets are identified. A consolidated packet is created and the consolidated packet is transmitted in response to a condition.

19 Claims, 8 Drawing Sheets

_US 7,756,160 B2_

PACKET CONSOLIDATION

TECHNICAL FIELD

The subject matter of this document relates to the field of data communications.

BACKGROUND

Communications networks are continually being adapted to best utilize the limited bandwidth available. While it is generally possible to add additional bandwidth to communications systems, the cost of doing so is sometimes prohibitive. Additionally, communications network utilization rates are typically unpredictable. This means that that they will go through periods where the available bandwidth is very high, but then also go through periods where the available bandwidth is not sufficient for the traffic.

This is especially true in networks when there is a widespread event which results in the creation of network traffic. For example, when there are natural disasters many of the communications networks which normally operate very reliably are overwhelmed by the increased traffic. A similar situation arises in the context of automated utility meter reading mesh networks. In these networks the widespread event can be a loss of service, such as a power outage. When there is a loss of power, it is generally experienced by a large number of houses and therefore, when the nodes of the network all attempt to report the outage, the network can be overloaded with a high level of traffic.

Designing a communications network to accommodate the peak level of communications traffic would assuredly result in a much higher cost to deploy the system. Additionally, after incurring the expense of deploying a network with the bandwidth to handle the peak load, much of that bandwidth would remain unused a high percentage of the time. Therefore, adding additional bandwidth by adding more communication lines is typically not an optimal solution.

SUMMARY

Systems, methods, and devices for consolidating network packetized data are provided. A system can include a plurality of nodes and a consolidator. The consolidator can receive communications packets from the nodes, identify the common content and unique attributes of the packets, generate a consolidated packet with one instance of the common content and each of the unique attributes, and send the consolidated packet in response to a condition. The consolidator can be implemented in a node, router, or other network communications device. The nodes can be deployed in an automated meter reading network.

Other systems can include a plurality of nodes, a consolidator, and a relay point. The consolidator can receive communications packets from the nodes, identify the common content and unique attributes of the packets, generate a consolidated packet with one instance of the common content and each of the unique attributes, and send the consolidated packet in response to a condition. The relay point can receive consolidated packets from the consolidator and transmit them to a destination. The relay point can be a network takeout point operable to send the network data to a destination such as a reporting station.

Methods for consolidating network packetized data can include: receiving communications packets from communications nodes; identifying common content and unique attributes of the communications packets; generating a consolidated packet containing the unique attributes and an instance of the common content; and sending the consolidated packet in response to a condition.

Devices for consolidating network packetized data can include a receive module, a content identification module, a packeting module, and a transmit module. The receive module can receive packets in a communications network. The content identification module can identify packets having common content. The packeting module can consolidate unique attributes from packets having common content into a consolidated packet having an instance of the common content. The transmit module can transmit the consolidated packet in the communications network in response to a condition.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
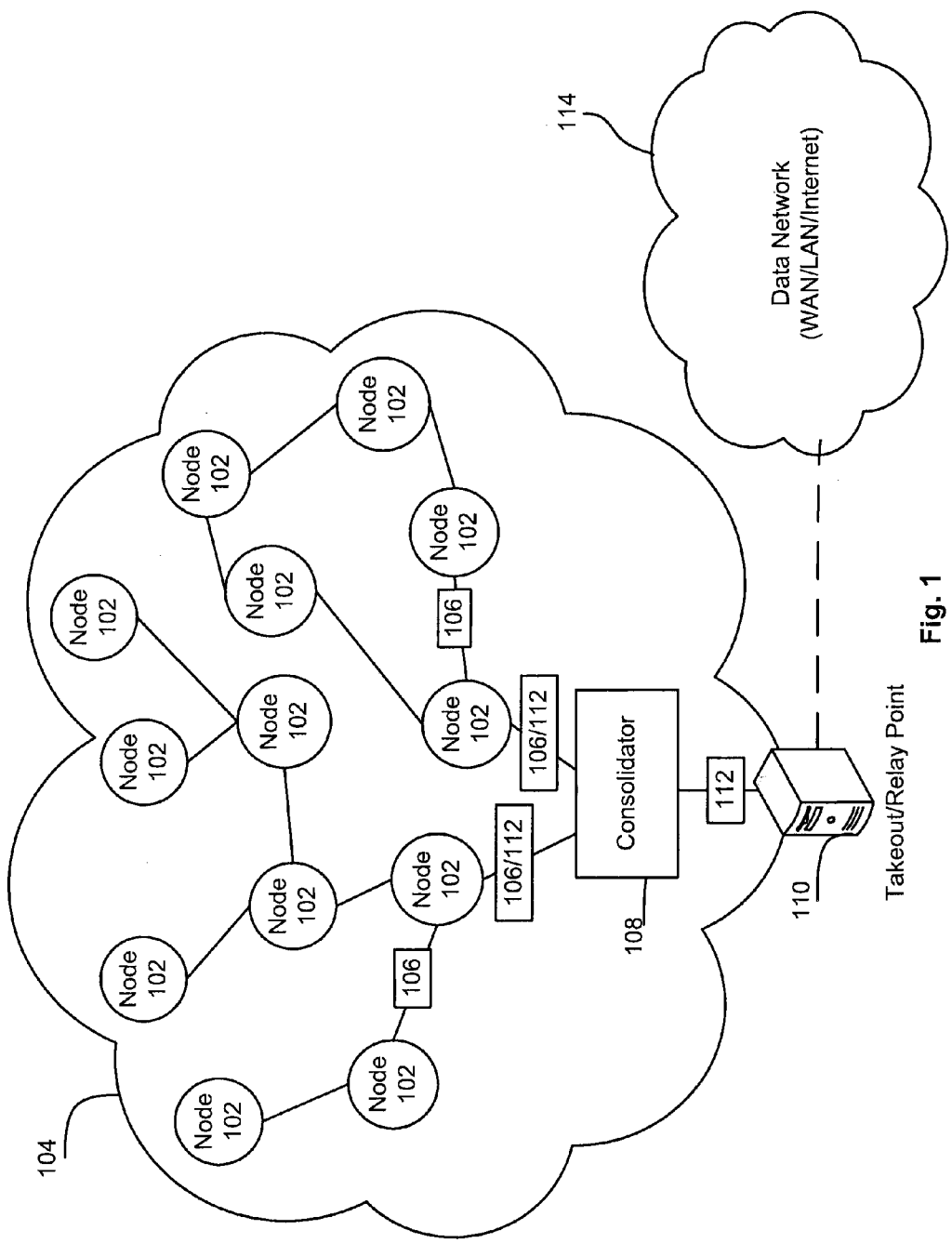
FIG. 1 is a block diagram illustrating a system for consolidating communications packets.

FIG. 1 is a block diagram illustrating a system for consolidating communications packets. FIG. 1 shows a plurality of nodes 102 in a communications network 104. The nodes 102 can be any device capable of communicating in a network environment. Each of the nodes 102 transmits communications packets 106. The network 104 may be a mesh network, as shown, or any other network configuration. Additionally, the network 104 can be implemented as an automatic meter reading network or implemented for any other general or specialized purpose.

Consolidator 108 is shown and may be implemented in nodes 102, routers, takeout points 110, or any other device capable of communicating in a packet network environment. The consolidator 108 may receive communications packets 106 from the nodes 102 or other consolidators 108, and consolidate the communications packets 106 into consolidated packets 112. The consolidated packets 112 are then transmitted to other nodes 102 or consolidators 108 until they reach the takeout point 110.

The takeout point 110, also referred to as a relay point, can be any network communication device that connects the network 104 to a WAN, LAN, the Internet, or any other public or private network 114 and relays the consolidated packets 112 to a destination. Additionally, the takeout point 110 can be the final destination of the consolidated packets 112 and may perform any processing of the consolidated packets 112 necessary. Further, takeout point 110 may be a wireless or hardwired connection to network resources, nodes 102, or consolidators 108. Finally, takeout point 110 may also operate as a consolidator 108, or node 102. In an implementation where the takeout point 110 is the final destination of the consolidated packets 112, the data network 114 may not be connected.

Figure 2:
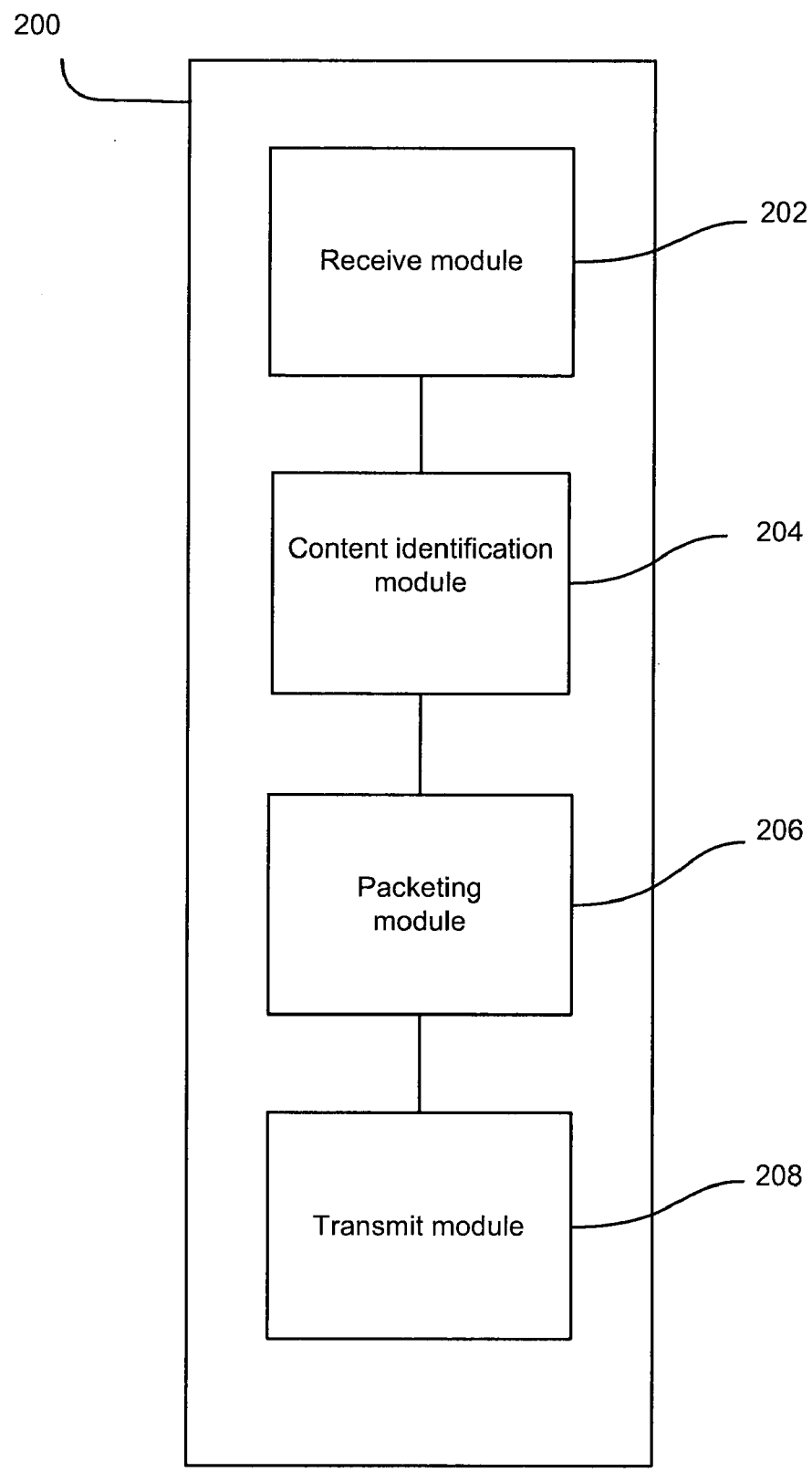
FIG. 2 is a block diagram representing a communications packet consolidation device.

FIG. 2 is a block diagram representing a communications packet consolidation device, generally designated by the number 200. The device comprises a receive module 202, content identification module 204, packeting module 206, and a transmit module 208. The receive module 202 receives communications packets 106 or consolidated packets 112 in a communication network 104. The receive module 202 can be implemented in a node 102, router, or any other device in communication with the network 104 capable of receiving packetized data.

The content identification module 204 identifies communications packets 106 or consolidated packets 112 for consolidation into a consolidated packet 112. The content identification module 204 can select packets for consolidation based on the content of the communications packets 106 received. The content identification module 204 can be implemented in any node 102, router, or any other device in communication with the network 104 capable of processing packetized data.

The packeting module 206 receives communications packets 106 from the content identification module 204 for consolidation into a consolidated packet 112. The packeting module 206 generates a consolidated packet 112 from the communications packets 106 received. The packeting module 206 continues consolidating received communications packets 106 into the consolidated packet 112 until the happening of a time based, energy based, or resource based condition, e.g. either a time limit elapses, a low energy level is detected or a buffer becomes full. Other events can trigger sending of the consolidated packet 112. The packeting module 206 may be implemented in any node 102, router, or other device in communication with the network 104 capable of processing packetized data.

Once the consolidated packet 112 is to be communicated (e.g. upon the occurrence of an event; time period expires, buffer full, low energy, etc.), the consolidated packet 112 is passed to the transmit module 208 for transmission through the network 104. The transmit module may be implemented in any node 102, router, or other device in communication with the network 104 capable of transmitting packetized data.

Figure 3:
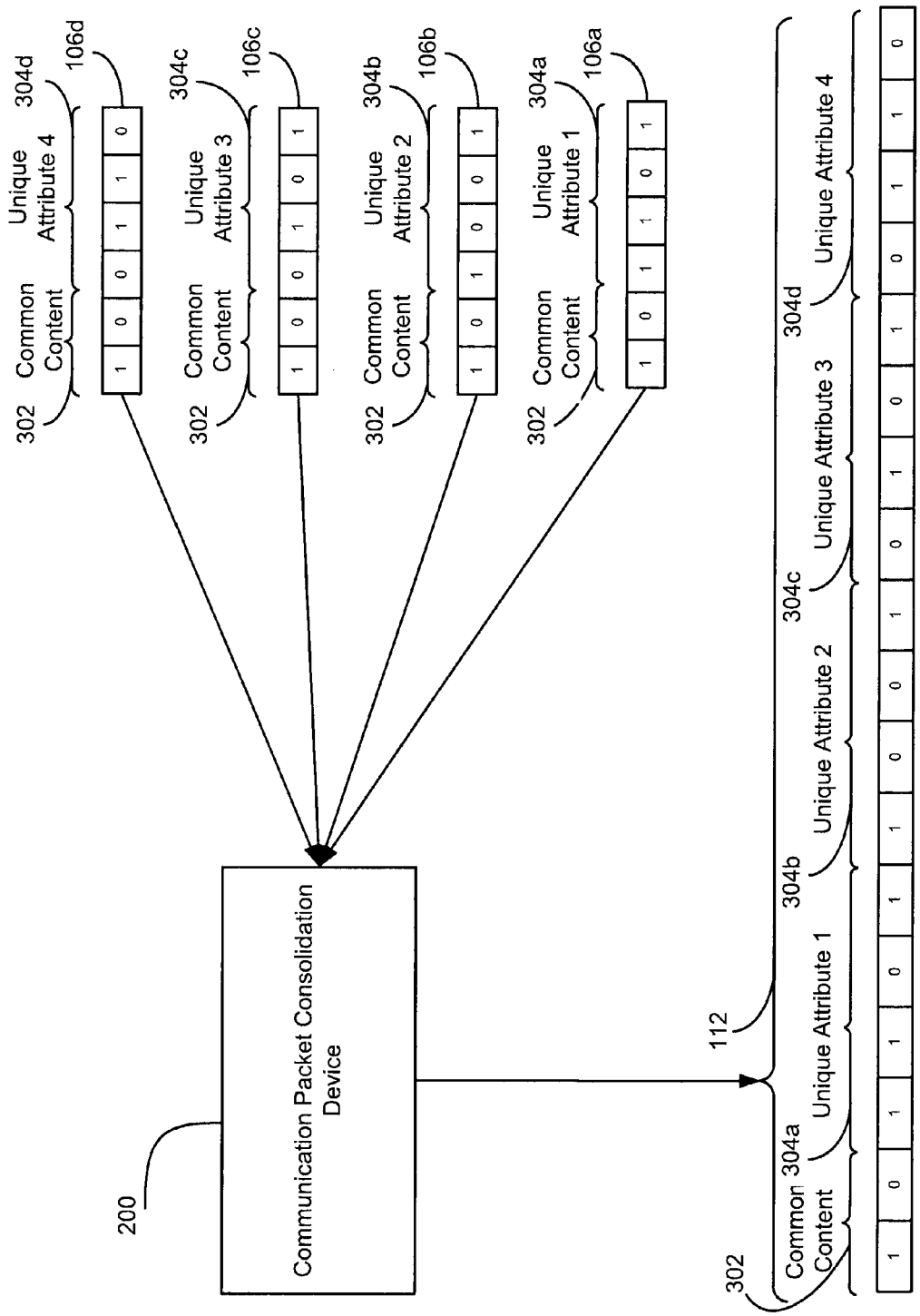
FIG. 3 is a block diagram illustrating one embodiment of packet consolidation.

FIG. 3 is a block diagram illustrating one embodiment of packet consolidation. FIG. 3 illustrates multiple communications packets 106a, 106b, 106c, and 106d being consolidated into consolidated packet 112 by the communication packet consolidation device 200. The communications packets 106a, 106b, 106c, and 106d each have a common content 302 and unique attributes 304a, 304b, 304c, and 304d respectively.

The common content 302 can be a packet header or any other portion of the communications packet 106. Further, the common content 302 can represent an alert such as a power event (e.g., power outage, power restoration, power surge, power sag, or brown out). Additionally, the common content 302 can be any other common data that is to be sent from multiple nodes 102. For example, the common content can represent a response from the nodes 102 to a broadcast.

The unique attributes 304a, 304b, 304c and 304d can contain information identifying the sender of the communications packet 104. Additionally, the unique attributes 304a, 304b, 304c, 304d can contain the location of the sender, the intended recipient of the packet, or any other desired information.

Communication packet consolidation device 200 receives the communications packets 106a, 106b, 106c, and 106d and consolidates them into a resulting consolidated packet 112 comprising one instance of the common content 302 and each of the unique attributes 304a, 304b, 304c, and 304d. While only one instance of the common content 302 is shown, the consolidated packet 112 may contain more than one instance, or may also include a footer, timing data, error correction data or other information regarding the packet transmitted.

Consolidating packets results in more efficient use of processing power and bandwidth. For example, a device receiving the consolidated packet 112 will process only one instance of the common content 302. However, had the communications packets 106a-d been individually processed then four instances of the same common content 302 would have been processed. Similarly, since the consolidated packet 112 generally contains only one instance of the data common to the consolidated communications packets 106a-d, transmission efficiency is increased by transmitting only one instance of the common content 302 rather than all four instances. This makes more bandwidth available for transmitting the unique identifiers. Although limiting the consolidated packet 112 to one instance of the common content 302 results in the greatest packet efficiency, the consolidated packet 112 may contain more than one instance of the common content 302 if desired.

Generally, all of the unique attributes 304a, 304b, 304c and 304d of the communications packets 106 will be included in the consolidated packet 112 but it should be appreciated that it is not required. For example, if a particular device or group of nodes 102 is known to be transmitting false alerts or otherwise inaccurate data, this data could be temporarily omitted from the consolidated packet 112 so that more bandwidth would be available for valid communications. Additionally, the consolidated packets 112 could be constructed utilizing only a portion of the unique attributes 304a-d, rather than all of the unique attributes 304a-d contained in each communications packet 106. This would be advantageous, for example, when the communications packets 106 carries signaling information, or information intended for other nodes 102 in communication with the transmitting node 102.

Figure 4:
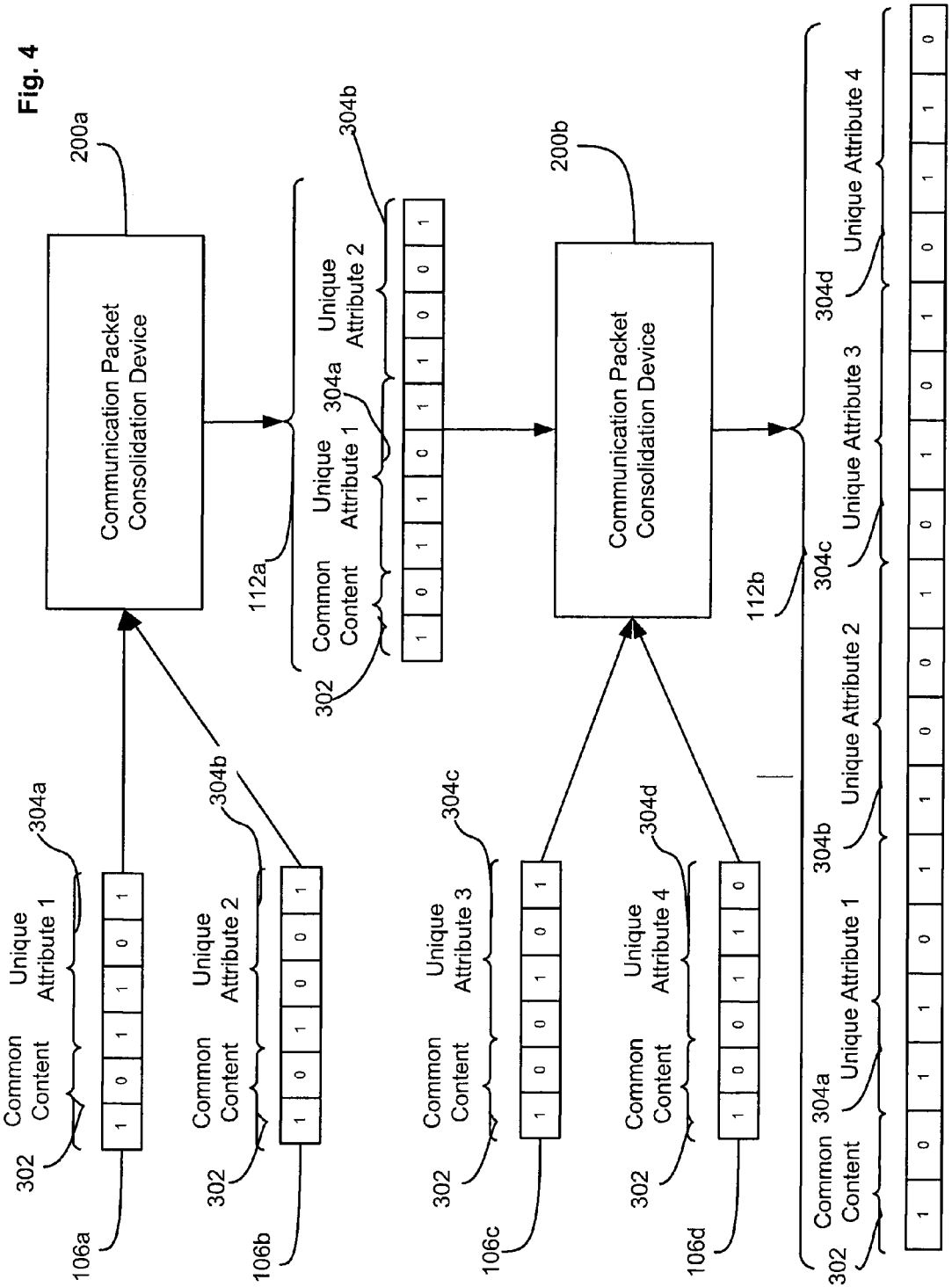
FIG. 4 is a block diagram illustrating another embodiment of packet consolidation.

FIG. 4 is a block diagram illustrating another embodiment of packet consolidation. In addition to consolidating individual communications packets 106, the communication packet consolidation device 200 can also consolidate communications packets 106 with an existing consolidated packet 112a as illustrated. In FIG. 4 the same four communications packets 106a, 106b, 106c, and 106d are available for consolidation. However, in this scenario communications packets 106a and 106b are first consolidated by the communications packet consolidation device 200a resulting in consolidated packet 112a.

Consolidated packet 112a may have capacity to carry additional unique attributes 304c and 304d due to the fact that consolidated packet 112a may be sent prior to being full because the time limit has expired or a low energy level is detected. Therefore, in order to further improve efficiency of the transmission, it is desirable for the communication packet consolidation device 200 to add unique attributes 304c and 304d from communications packets 106c and 106d to the partially filled consolidated packet 112a.

FIG. 4 shows a first communications packet 106a having a common content 302 and a first unique attribute 304a. Also shown is a second communications packet 106b having a common content 302 and a second unique attribute 304b. Both communications packets 106a and 106b are received by a first communication packet consolidation device 200a. The first communication packet consolidation device 200a consolidates the communications packets 106a and 106b resulting in consolidated packet 112a. The first communication packet consolidation device 200a then transmits the first consolidated packet 112a to the second communication packet consolidation device 200b.

The second communication packet consolidation device 200b receives the first consolidated packet 112a as well as a third communication packet 106c, and a fourth communication packet 106d. The third and fourth communications packets 106c and 106d each have a common content 302 and a third unique attribute 304c and fourth unique attribute 304d, respectively. The second communication packet consolidation device 200b consolidates communications packets 106c and 106d into the first consolidated packet 112a, resulting in consolidated packet 112b. The consolidated packet 112b is transmitted through the communications network 104 having one common content 302 and the unique attributes 304a, 304b, 304c, and 304d. This consolidation can be performed at any communication packet consolidation device 200 encountered by a consolidated packet.

Similarly, communications packets 106c and 106d can first be consolidated by communication packet consolidation device 200b, and then further consolidated with consolidated packet 112a again resulting in the creation of consolidated packet 112b. This scenario is illustrated in FIG. 5.

Figure 5:
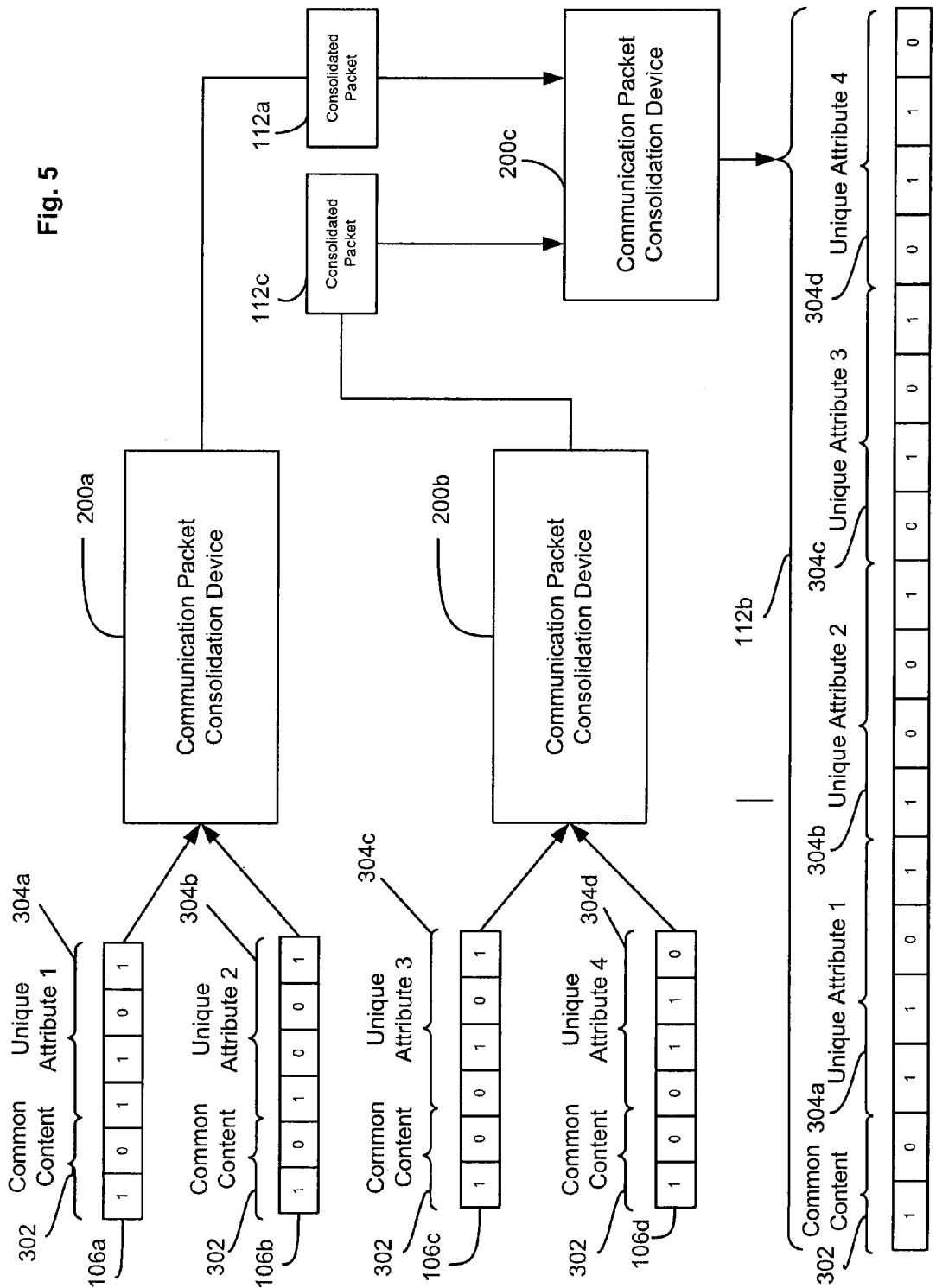
FIG. 5 is a block diagram illustrating still another embodiment of packet consolidation.

FIG. 5 is a block diagram illustrating still another embodiment of packet consolidation. As shown in FIG. 5, the consolidation of communications packets 106a, and 106b in the same manner described in reference to FIG. 4 resulting in consolidated packet 112a. Here though, instead of communications packets 106c and 106d being consolidated individually with consolidated packet 112a, communications packets 106c and 106d are first consolidated by communication packet consolidation device 200b resulting in the consolidation packet 112c. Consolidation packet 112c and consolidation packet 112a are then further consolidated by communication packet consolidation device 200c to again obtain the consolidation packet 112b. Consolidation can continue to be accomplished in the manner described as long as the number of unique attributes 304 contained in the consolidation packets does not exceed the unique attribute limit of the consolidated packet.

Figure 6:
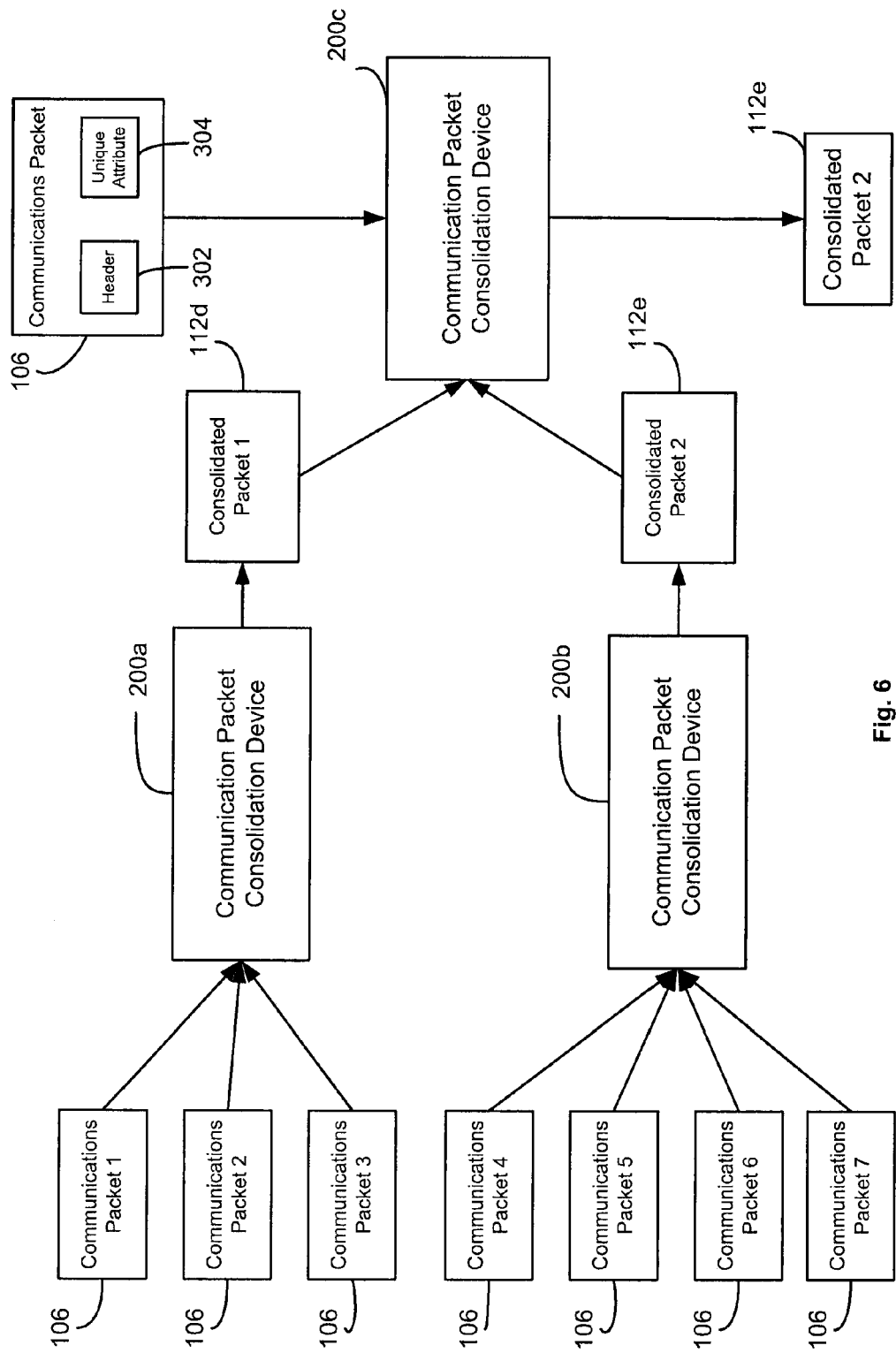
FIG. 6 is a block diagram illustrating an embodiment of consolidated packet routing.

FIG. 6 is a block diagram illustrating an embodiment of consolidated packet routing. Referring to FIG. 6, if two consolidated packets 112d and 112e are received by communication packet consolidation device 200c (or any subsequent communication packet consolidation device 200) and the consolidated packets 112d and 112e cannot be fully consolidated, then one of the consolidated packets 112d or 112e may be sent while the other is retained by the communication packet consolidation device 200c to be filled with additional unique attributes 304.

This scenario can arise, for example, if one consolidated packet 112d contains three unique attributes, a second consolidated packet 112e contains four unique attributes, and the attribute limit for a consolidation packet 112 is six unique attributes. In this scenario, a combined consolidated packet 112 may not be created because the two consolidated packets 112d and 112e contain a total of seven unique attributes 304.

In an exemplary implementation, either consolidated packet 112d or 112e can be filled with unique attributes from the other consolidated packet. For example, consolidated packet 112e may be filled with two of the three unique attributes contained in consolidated packet 112d and sent, while consolidated packet 112d is retained to receive additional unique attributes. Similarly, consolidated packet 112d could be filled with unique attributes from consolidated packet 112e and sent, while consolidated packet 112e is retained to receive additional unique attributes. The consolidated packet to be filled and sent can be selected based on the order in which the packets were received, the utilized capacity of the packets, or any other criteria.

Alternatively, one of the packets may be sent without adding any additional unique attributes while the other is retained to collect additional unique attributes 304 from communications packets 106. For example, the consolidated packet 112d or 112e containing the most unique attributes 304 may be sent while the other would be retained to receive additional unique attributes 304 from communications packets 106. This would result in consolidated packet 112e, containing four unique attributes 304 being sent and the consolidated packet 112d, containing three unique attributes 304 being retained to consolidate additional communications packets 106.

While this example demonstrates sending consolidated packet 112e having the most unique attributes 304, any criteria could be utilized for determining which packet is transmitted based on the preference of the network administrator. Alternatively, both consolidated packets 112d and 112e may be retained until required to be transmitted in response to a condition. Additionally, it should be noted that the capacity of a consolidated packet 112 is merely a design choice and will vary according to the application and preferences of the network administrator. Therefore, the consolidated packet size referenced above is for purposes of example only and should not be regarded as a limitation.

Figure 7:
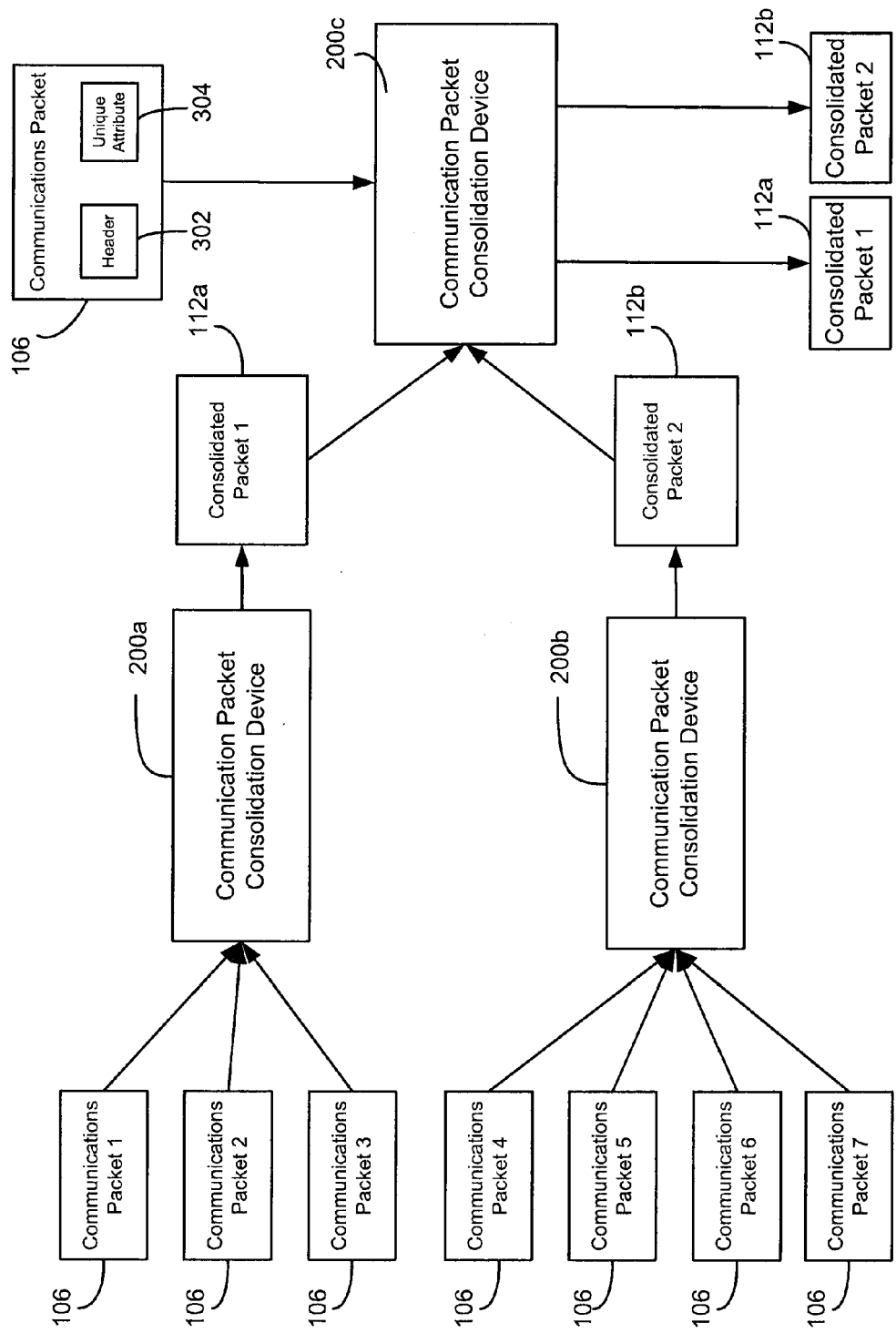
FIG. 7 is a block diagram illustrating an embodiment of concurrent packet consolidation.

FIG. 7 is a block diagram illustrating an embodiment of concurrent packet consolidation. In this embodiment multiple consolidated packets 112a and 112b are generated concurrently. Each of the consolidated packets 112a and 112b has a unique instance of the common content 302 and unique attributes 304. For example, consolidated packet 112a could contain a common content 302 indicating a power outage and also containing unique attribute 304 representing the identities or locations of the nodes 102 reporting a power outage. At the same time, a consolidated packet 112b may be generated containing a common content 302 indicating restoration of power and containing the identity or locations of the nodes 102 which are reporting that power has been restored. Thus, it is not necessary to send the consolidated packet 112a prior to generating a consolidated packet 112b.

Figure 8:
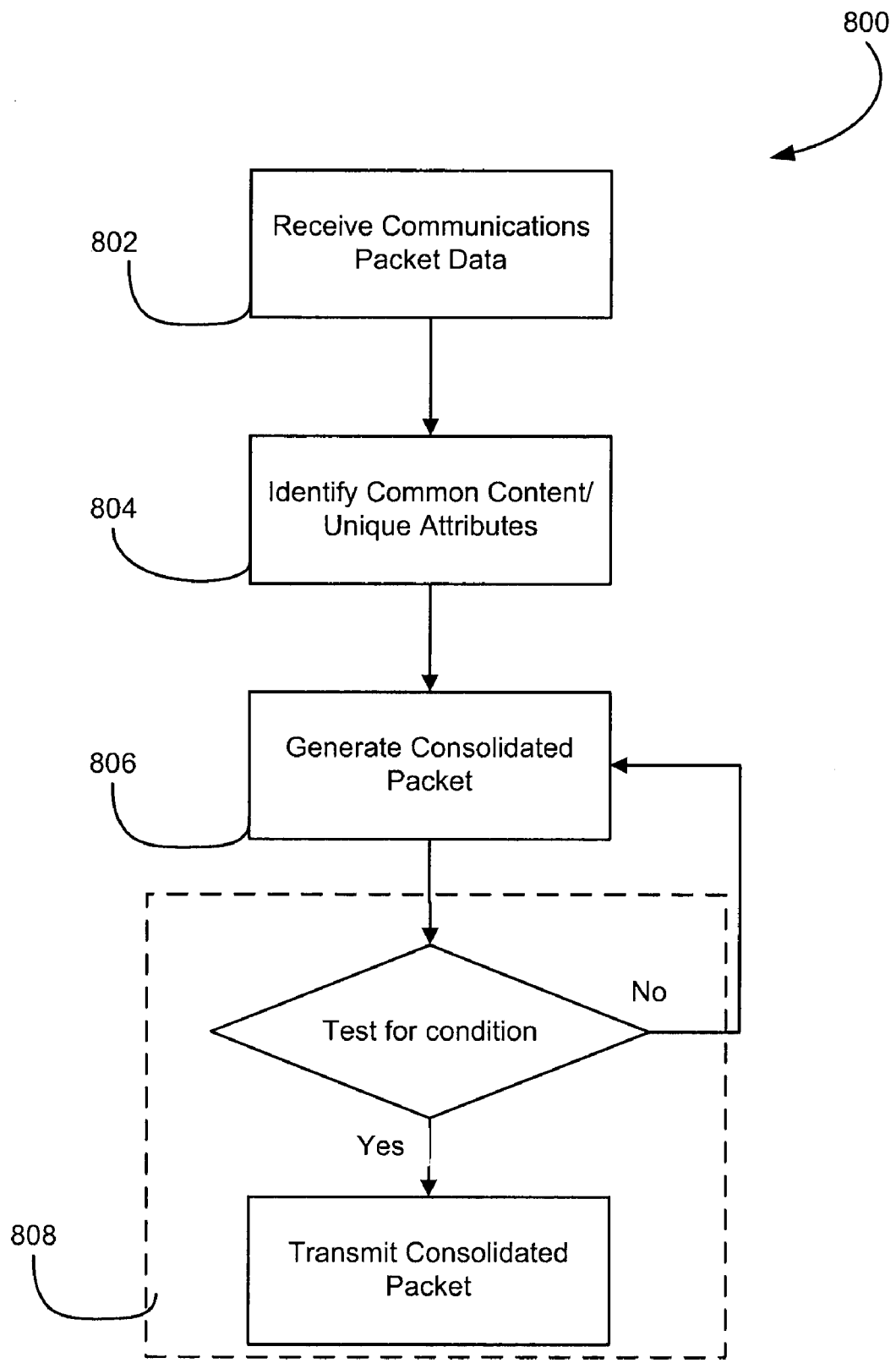
FIG. 8 is a flow chart illustrating a method of packet consolidation.

FIG. 8 is a flow chart illustrating a method of packet consolidation, generally designated by the number 800. The method 800 begins at step 802 where communications packets 106 are received from a network 104. The communications packets 106 may have a common content 302 and unique attributes 304.

The communications packets 106 can be received by a node 102, router, or any other device in communication with the network 104 capable of receiving packetized data. In an exemplary embodiment the method is performed in an automated meter reading mesh network wherein the nodes 102 of the network 104 can be utility meters, routers, or any other device configured to communicate in the network 104. It should be appreciated that the method 800 can be performed in any network architecture.

At step 804 the communications packets 106 are analyzed to identify the common content 302 and unique attributes 304 within the communications packets 106.

At step 806 a consolidated packet 112 is generated. The communications packets 106 are consolidated by creating a packet which contains an instance of the common content 302 as well as the unique attributes 304 of the communications packets 106. More than one instance of the common content 302 can be included in the consolidated packet 112 if desired.

At step 808 the consolidated packet 112 is transmitted if a condition is met. The condition can be a time limit, a buffer becoming full, detection of a low energy level, or any other condition. In an automated meter reading network and particularly in a mesh network it is important for packets to be sent within a set time limit or prior to the energy level falling below a threshold. This is true regardless of whether the consolidated packet 112 has become full, because in a power outage situation reserve power is limited in many of the devices. Therefore, if consolidated packets 112 are not sent before the reserve power is exhausted, the device will power down before the consolidated packet 112 is sent. While it is preferred that only full consolidated packets 112 be sent because this results in the highest data transfer efficiency, packets can be sent prior to power down regardless of their content. However, if the condition is not met, then the consolidated packet 112 will continue to be filled with additional unique attributes 304.

A number of embodiments have been described. Nevertheless, it will be understood that various modifications may be made without departing from the spirit and scope of the invention. Accordingly, other embodiments are within the scope of the following claims.

What is claimed is:

1. A method, comprising:
   receiving communications packets from communications nodes;
   identifying common content and unique attributes of the communications packets;
   generating a consolidated packet containing the unique attributes and an instance of the common content, wherein a plurality of consolidated packets, each having a unique instance of the common content, are generated concurrently; and
   sending the consolidated packet in response to a condition.

2. The method of claim 1, wherein the nodes are in a mesh network.

3. The method of claim 1, wherein the nodes are in an automated meter reading network.

4. The method of claim 1, wherein the condition is time based, resource based, or energy based.

5. The method of claim 1, wherein the common content comprises a packet header.

6. The method of claim 1, wherein the common content indicates a power event or a response to a broadcast.

7. The method of claim 1, wherein the unique attributes of the communications packets identify the communications nodes.

8. A device, comprising:
   a receive module to receive packets in a communications network;
   a content identification module to identify packets having instances of common content;
   a packeting module to consolidate unique attributes from the packets having the instances of common content into a consolidated packet containing an instance of the common content, wherein a plurality of consolidated packets, each having a unique instance of the common content, are generated concurrently; and
   a transmit module to transmit the consolidated packet in the communications network, in response to a condition.

9. The device of claim 8, wherein the communications network is a mesh network.

10. The device of claim 8, wherein the common content comprises a packet header.

11. The device of claim 8, wherein the common content indicates a power event or a response to a broadcast.

12. The device of claim 8, wherein the condition is time based, resource based, or energy based.

13. The device of claim 8, wherein the unique attributes identify a sender of the packet.

14. A system, comprising:
    a plurality of nodes in a communications network to transmit communications packets having common content and unique attributes; and
    a consolidator to receive the communications packets and consolidate the communications packets into consolidated packets, wherein each of the consolidated packets contain a unique instance of the common content and the unique attributes of the communications packets corresponding to the unique instance of the common content, and wherein the consolidated packets are generated concurrently.

15. The system of claim 14, further comprising a relay point to receive the consolidated packets and transmit them to a destination.

16. The system of claim 14, wherein the communications network is a mesh network.

17. The system of claim 14, wherein the communications network is an automated meter reading network.

18. The system of claim 14, wherein the common content indicates a power event or a response to a broadcast.

19. The system of claim 14, wherein the consolidator transmits the consolidated packets in response to a time based, resource based, or energy based condition.

* * * * *